United States Patent
Herbison et al.

(10) Patent No.: US 10,938,304 B2
(45) Date of Patent: Mar. 2, 2021

(54) VOLTAGE- AND CURRENT-BASED CONTROL OF DIRECT CURRENT (DC)-DC CONVERTER

(71) Applicant: Intel Corporation, Santa Clara, CA (US)

(72) Inventors: David Herbison, Munich (DE); Marc Hesener, Munich (DE); Tobias Werth, Munich (DE); Stefan Guenther, Munich (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/447,699

(22) Filed: Jun. 20, 2019

(65) Prior Publication Data

US 2019/0305678 A1    Oct. 3, 2019

(51) Int. Cl.
*H02M 3/156* (2006.01)
*H02M 1/32* (2007.01)
(Continued)

(52) U.S. Cl.
CPC ............... *H02M 3/156* (2013.01); *G05F 1/46* (2013.01); *G06F 1/184* (2013.01); *G06F 1/26* (2013.01); *H02H 7/1213* (2013.01); *H02M 1/32* (2013.01)

(58) Field of Classification Search
CPC . H02M 2001/0009; H02M 2001/0025; H02M 2001/0048; H02M 2001/0058;
(Continued)

(56) References Cited

U.S. PATENT DOCUMENTS 7,414,383 B2 * 8/2008 Burton ................ H02M 3/1584
                                                    323/271
7,714,556 B2 * 5/2010 Chu .................... H02M 3/1588
                                                    323/222
(Continued)

FOREIGN PATENT DOCUMENTS

KR    10-1808607 B1    12/2017

OTHER PUBLICATIONS

International Search Report and Written Opinion dated Jul. 8, 2020 for International Application No. PCT/US2020/024296, 11 pages.

*Primary Examiner* — Gustavo A Rosario-Benitez
(74) *Attorney, Agent, or Firm* — Schwabe, Williamson & Wyatt, P.C.

(57) ABSTRACT

Various embodiments provide a direct current (DC)-DC converter circuit. The DC-DC converter circuit includes a control circuit to switch the DC-DC converter circuit between a charge state, a discharge state, and a tri-state mode. As part of a first control loop, the control circuit may switch the DC-DC converter between the charge state and the discharge state based on the output voltage to provide the output voltage with the target voltage level. Additionally, as part of a second control loop, the control circuit may switch the DC-DC converter between the charge state and the discharge state based on the current through an inductor of the DC-DC converter. The second control loop may provide overcurrent protection for the DC-DC converter. Other embodiments may be described and claimed.

19 Claims, 6 Drawing Sheets

(51) Int. Cl.
*H02H 7/12* (2006.01)
*G05F 1/46* (2006.01)
*G06F 1/18* (2006.01)
*G06F 1/26* (2006.01)

(58) Field of Classification Search
CPC ........ H02M 1/32; H02M 3/156; H02M 3/158; H02M 3/1588
See application file for complete search history.

(56) References Cited

U.S. PATENT DOCUMENTS

| | | | |
|---|---|---|---|
| 7,719,251 B2 * | 5/2010 | Qahouq | H02M 3/1588 323/284 |
| 2006/0061343 A1 * | 3/2006 | Lipcsei | H02M 3/1582 323/283 |
| 2008/0101102 A1 * | 5/2008 | Lipcsei | H02M 1/36 363/74 |
| 2013/0207625 A1 * | 8/2013 | Futamura | G05F 1/10 323/271 |
| 2014/0152272 A1 | 6/2014 | Bazzani et al. | |
| 2014/0232359 A1 * | 8/2014 | Dash | H02M 3/158 323/235 |
| 2018/0123440 A1 * | 5/2018 | Lee | H02M 1/08 |
| 2019/0190381 A1 * | 6/2019 | Chesneau | H02M 3/155 |
| 2019/0229607 A1 * | 7/2019 | Kim | H02M 1/088 |

* cited by examiner

VOLTAGE- AND CURRENT-BASED CONTROL OF DIRECT CURRENT (DC)-DC CONVERTER

FIELD

Embodiments of the present invention relate generally to the technical field of electronic circuits, and more particularly to voltage- and current-based control of a direct current (DC)-DC converter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Direct current (DC)-DC converters (also referred to as voltage regulators) in many applications, such as mobile devices, need to efficiently deliver an output voltage to a load over a wide range of load currents. For example, the DC-DC converter should have high efficiency at a light load current in order to provide low power consumption. Additionally, the DC-DC converter is expected to handle large and/or quick increases to the load current with minimal undershoot of the output voltage.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments provide a direct current (DC)-DC converter circuit, also referred to as a voltage regulator circuit. The DC-DC converter circuit may provide a regulated output voltage at an output node. The DC-DC converter circuit may be a discontinuous conduction mode (DCM) circuit. Accordingly, the DC-DC converter circuit may include a control circuit to switch the DC-DC converter circuit between a first state (e.g., a charge state), a second state (e.g., a discharge state), and a tri-state mode. During the charge state, the current provided to the output node via an inductor of the DC-DC converter may increase. The inductor current may decrease during the discharge state, and may be zero during the tri-state mode.

In various embodiments, the control circuit may utilize a first control loop and a second control loop to control the DC-DC converter. As part of the first control loop, the control circuit may switch the DC-DC converter between the charge state and the discharge state based on the output voltage to provide the output voltage with the target voltage level. Additionally, as part of the second control loop, the control circuit may switch the DC-DC converter between the charge mode and the discharge mode based on the current through an inductor of the DC-DC converter. The second control loop may provide overcurrent protection for the DC-DC converter.

For example, as part of the first control loop, the control circuit may switch the DC-DC converter circuit from the charge state to the discharge state based on a determination that the regulated output voltage is greater than a first voltage threshold; and switch the DC-DC converter circuit from the discharge state to the charge state based on a determination that the regulated output voltage is less than a second voltage threshold. The second voltage threshold may be the same or different than the first voltage threshold. In some embodiments, the control circuit may also require one or more additional criteria to be met, in addition to the output voltage being greater than the first voltage threshold, to switch the DC-DC converter from the charge state to the discharge state. For example, the one or more additional criteria may include the inductor current being greater than a minimum current. This may increase the efficiency of the DC-DC converter.

As part of the second control loop, the control circuit may switch the DC-DC converter circuit from the charge state to the discharge state based on a determination that an inductor current through the inductor is greater than a first current threshold, and switch the DC-DC converter circuit from the discharge state to the charge state based on a determination that the inductor current is less than a second current threshold. The second current threshold may be non-zero and less than the first current threshold.

Additionally, the control circuit may switch the DC-DC converter circuit from the discharge state to the tri-state mode when the inductor current reaches zero. The control circuit may switch the DC-DC converter circuit from the tri-state mode to the charge state when the regulated output voltage drops below the second voltage threshold (which, as stated above, may be the same as the first voltage threshold in some embodiments).

Accordingly, the techniques described herein may provide a single control mode/scheme that provides DCM operation to efficiently generate the regulated output voltage, while also providing overcurrent protection.

Figure 1:
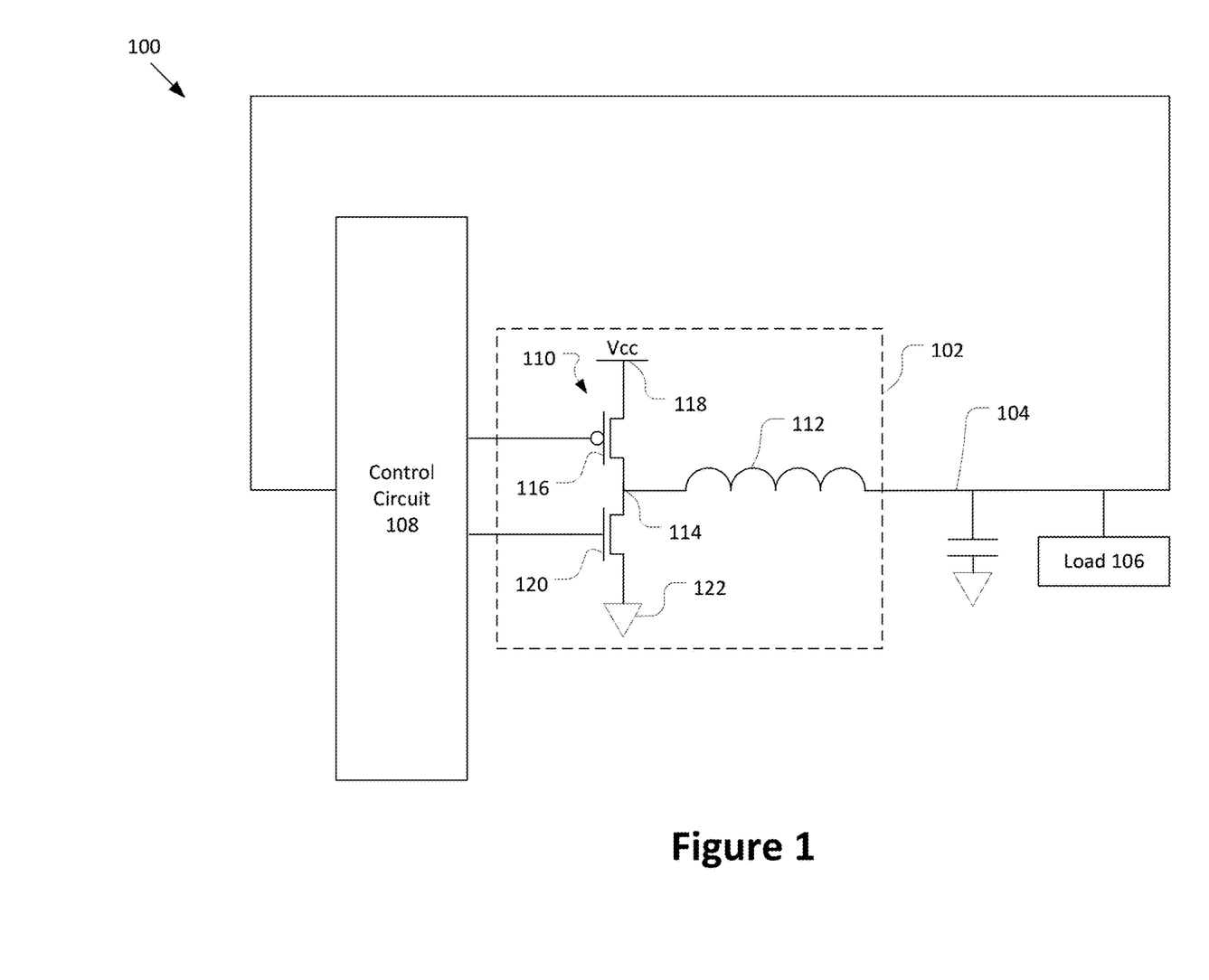
FIG. 1 illustrates a DC-DC converter circuit, in accordance with various embodiments.

FIG. 1 illustrates a DC-DC converter circuit 100 (hereinafter "circuit 100"), in accordance with various embodiments. The circuit 100 may include a DC-DC converter 102 coupled to an output node 104 to generate a regulated output voltage at the output node 104. The regulated output voltage may be provided to a load 106. The load 106 may be, for example, a circuit block that uses the regulated output voltage as a power supply. The circuit 100 may further include a control circuit 108 coupled to the DC-DC converter 102 to control operation of the DC-DC converter 102. For example, in some embodiments, the control circuit 108 may control operation of the DC-DC converter based on the output voltage and an output current of the DC-DC converter, as further discussed herein.

In various embodiments, the DC-DC converter 102 may include a driver circuit 110 (also referred to as a bridge circuit) coupled to an inductor 112. The driver circuit 110 and inductor 112 may be referred to as an output stage of the DC-DC converter 102. In some embodiments, the inductor 112 may be coupled between the output node 104 and an internal/intermediate node 114 of the output stage. The driver circuit 110 may include a pull-up transistor 116 (also referred to as a high-side transistor) coupled between the internal node 114 and a supply rail 118. The supply rail 118 may receive a supply voltage (also referred to as an input voltage, and labeled as Vcc in FIG. 1), which may be a DC voltage. The driver circuit 110 may further include a pull-down transistor 120 (also referred to as a low-side transistor) coupled between the internal node 114 and a ground terminal 122.

It will be apparent that other embodiments of the DC-DC converter 102 may include a different design, additional components, and/or a different configuration of the driver circuit 110 and/or inductor 112, such as one or more additional transistors coupled between the supply rail 118 and the internal node 114 (e.g., in a cascode arrangement) and/or one or more additional transistors coupled between the internal node 114 and the ground terminal 122. For example, FIG. 1 depicts the pull-up transistor 116 as a p-type metal-oxide-semiconductor (PMOS) transistor and the pull-down transistor 120 as an n-type metal-oxide-semiconductor (NMOS) transistor, other embodiments may include a different type of transistor for the pull-up transistor 116 and/or pull-down transistor 120.

In various embodiments, the control circuit 108 may provide respective control signals to the gate terminals of the pull-up transistor 116 and pull-down transistor 120 to control a state of the DC-DC converter. For example, when the DC-DC converter 102 is in a first state (e.g., charge state), the pull-up transistor 116 may be on and the pull-down transistor 120 may be off. Accordingly, the output node 104 may be coupled to the supply rail 118 via the inductor 112 and pull-up transistor 116, thereby causing the current supplied from the DC-DC converter 102 to the output node 104 via the inductor 112 to increase.

When the DC-DC converter 102 is in a second state (e.g., discharge state), the pull-up transistor 116 may be off and the pull-down transistor 120 may be on. Accordingly, the output node 104 may be coupled to the ground terminal 122 via the inductor 112 and pull-down transistor 120, thereby causing the current supplied from the DC-DC converter 102 to the output node 104 via the inductor 112 to decrease. When the DC-DC converter is in a third state (e.g., tri-state mode or standby mode), both the pull-up transistor 116 and pull-down transistor 120 may be off. Accordingly, the output node 104 may be uncoupled from both the supply rail 118 and the ground terminal 122.

The control circuit 108 may monitor the output voltage at the output node 104 and the inductor current through the inductor 112, and may control the state of the DC-DC converter 100 based on the output voltage and/or inductor current. The DC-DC converter 100 may include any suitable circuitry to measure and/or feedback the output voltage and/or inductor current. For example, the DC-DC converter 100 may include a current sensor (e.g., sense transistor and/or other circuitry) in the pull-up path and another current sensor in the pull-down path to determine the inductor current. The DC-DC converter 100 may further include comparators to compare the respective currents and voltage to the respective thresholds, as described further herein.

Figure 2:
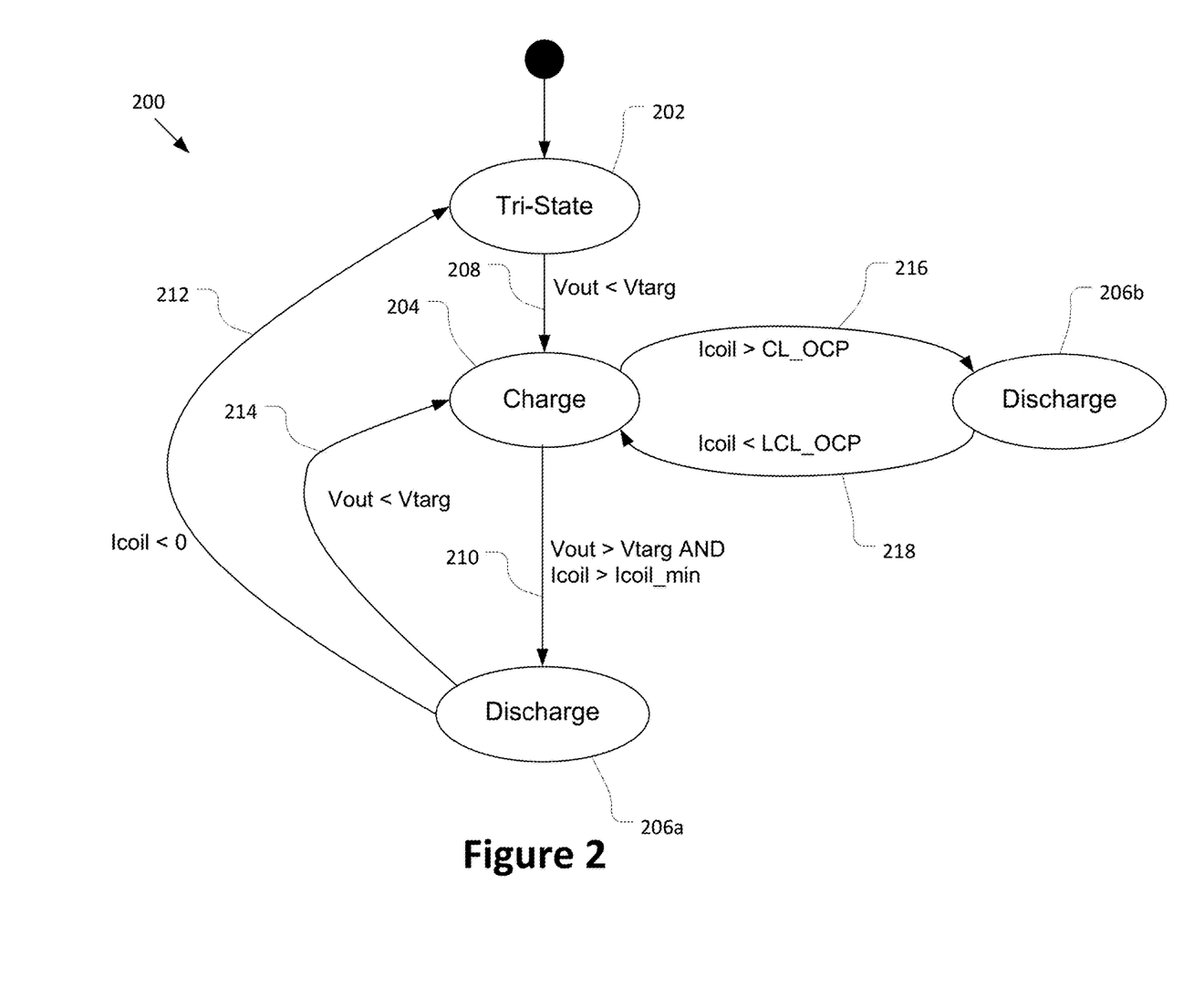
FIG. 2 illustrates a control scheme for a DC-DC converter, in accordance with various embodiments.

FIG. 2 is a state diagram that illustrates a control scheme 200 for a DC-DC converter in accordance with various embodiments. For example, the control scheme 200 may be implemented by the control circuit 108 to control the DC-DC converter 102. The control circuit 108 may switch the DC-DC converter between a tri-state mode 202, a charge state 204, and a discharge state 206a-b according to the control scheme 200.

The control scheme 200 will be described starting with the DC-DC converter in the tri-state mode 202. As discussed above, when the DC-DC converter is in tri-state mode, both the pull-up transistor and the pull-down transistor may be off. The control circuit may monitor the output voltage at the output node (e.g., provided by the DC-DC converter). At 208 of the control scheme, if the output voltage falls below a voltage threshold (also referred to as a target voltage threshold) Vtarg (e.g., Vout<Vtarg), the control circuit switches the DC-DC converter from the tri-state mode to the charge state 204. Accordingly, the control circuit turns on the pull-up transistor and turns off the pull-down transistor.

When in the charge state 204, the control circuit may monitor the output voltage and the inductor current through the inductor of the DC-DC converter (e.g., inductor 112 of DC-DC converter 100, which may be the same as the output current of the DC-DC converter 100). The control scheme 200 may include two separate control loops for switching the state of the DC-DC converter from the charge state 204 to the discharge state 206a and discharge state 206b, respectively. Discharge state 206a and discharge state 206b represent the same state of the DC-DC converter (e.g., with the pull-down transistor on and the pull-up transistor off).

As part of a first control loop, the control circuit may determine when the output voltage rises above the voltage threshold. At 210 of the control scheme 200, the control circuit may switch the DC-DC converter from the charge state 204 to the discharge state 206a based on a determination that the output voltage is greater than the voltage threshold. FIG. 2 shows the control scheme 200 using the same voltage threshold for switching the DC-DC converter from the charge state 204 to the discharge state 206a, for switching the DC-DC converter from the tri-state mode 202 to the charge state 204, and for switching the DC-DC converter from the discharge state 206a to the charge state 204 (as further discussed below). However, in other embodiments, the control scheme 200 may use different voltage thresholds, e.g., one voltage threshold to determine whether to switch from the charge state 204 to the discharge state 206a, and a different (e.g., lower) voltage threshold to determine whether to switch from the discharge state 206a to the charge state 204.

In some embodiments, the control circuit may additionally require one or more additional criteria to be met to cause the control circuit to switch the DC-DC converter from the charge state 204 to the discharge state 206 at 210, in addition to the output voltage being greater than the voltage threshold. The one or more additional criteria may increase the efficiency of the DC-DC converter and/or reduce the switching frequency between the charge mode 204 and the discharge mode 206.

For example, the one or more additional criteria may include a determination that the inductor current (Icoil) is greater than a minimum current threshold. Accordingly, as shown in FIG. 2, at 210 of the control scheme 200, the control circuit may switch the DC-DC converter from the charge state 204 to the discharge state 206a if the output voltage is greater than the voltage threshold and if the inductor current is greater than the minimum current threshold. This may ensure that the inductor current reaches a level that provides optimum efficiency. The value of the minimum current threshold may be dependent on the design of the DC-DC converter (e.g., the drive circuit and/or other aspects of the output stage) and/or the size of the inductor.

At light load (e.g., low current draw by the load coupled to the output node), the current-based control (e.g., based on the minimum current threshold) may dominate the switching decisions. At high load, the control based on the output voltage (e.g., based on the target voltage threshold) may dominate the switching decisions in the first control loop. Accordingly, the DC-DC converter may provide high efficiency over a wide range of loading conditions (in addition to the overcurrent protection provided by the second control loop).

Alternatively, or additionally, the one or more additional criteria may include a minimum time period that the DC-DC converter must stay in the charge state 204 before it is switched to the discharge state 206a at 210 of the control scheme 200. Alternatively, in some embodiments, the control circuit may switch the DC-DC converter from the charge state 204 to the discharge state 206a if the output voltage is greater than the voltage threshold without regard to any additional criteria. In some such embodiments, the control circuit may use a different voltage threshold for switching the DC-DC converter from the charge state 204 to the discharge state 206a than for switching the DC-DC converter from the discharge state 206a to the charge state 204, thereby reducing switching frequency compared with an embodiment in which the same voltage threshold is used.

In various embodiments, when the DC-DC converter is in the discharge state 206a, the control circuit may monitor the output voltage and the inductor current. At 212 of the control scheme 200, if the inductor current reaches zero, the control circuit may switch the DC-DC converter back to the tri-state mode 202. However, if the output voltage drops below the voltage threshold (Vtarg) before the inductor current reaches zero, then the control circuit may switch the DC-DC converter from the discharge state 206a back to the charge state 204.

As discussed above, the control scheme 200 may also include a second control loop that switches the DC-DC converter between the charge state 204 and the discharge state 206b. The second control loop may be performed in parallel with the first control loop described above (e.g., that includes operations 210, 212, and 214). The second control loop may switch the DC-DC converter between the charge state 204 and the discharge state 206b based on the inductor current of the DC-DC converter (e.g., using hysteretic current control). The second control loop may provide overcurrent protection (OCP) for the DC-DC converter. For example, at 216 of the control scheme 200, when the inductor current is greater than an upper OCP threshold (CL_OCP), the control circuit may switch the DC-DC converter from the charge state 204 to the discharge state 206b. When the inductor current then drops below a lower OCP threshold (LCL_OCP), the control circuit may switch the DC-DC converter from the discharge state 206b back to the charge state 204. The lower OCP threshold may be non-zero and less than the upper OCP threshold. The current-based hysteretic control of the second control loop may enable precise definition of the upper OCP threshold to avoid exceeding the current capability of the DC-DC converter. Additionally, the upper and lower OCP thresholds may be set relatively high, enabling the DC-DC converter to hit the thresholds during large transients without getting into unstable limit cycles as can happen with prior approaches for overcurrent protection using pulse-width modulation (PWM).

Figure 3A:
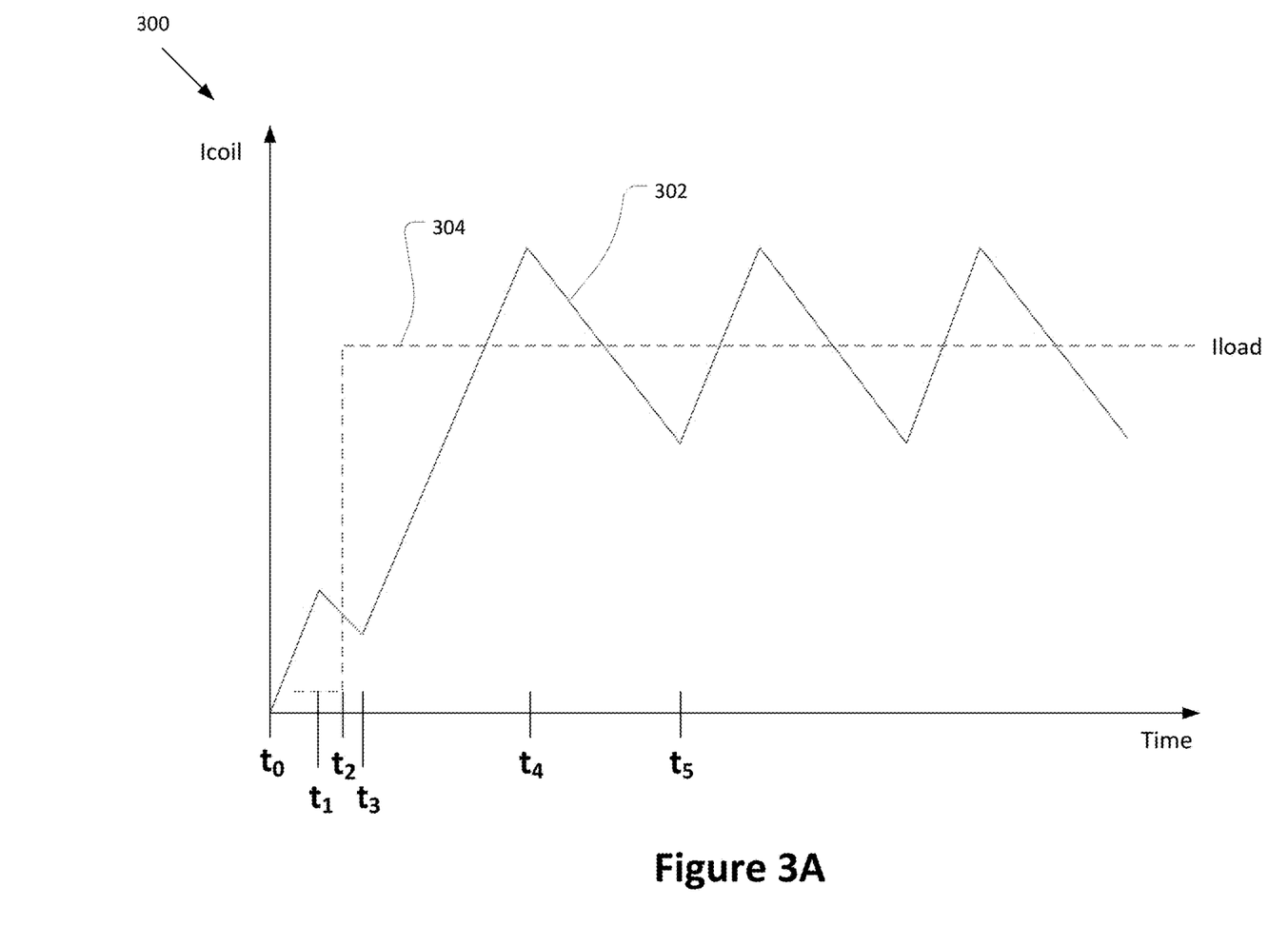
FIG. 3A illustrates a graph of the inductor current in a DC-DC converter over time, in accordance with various embodiments.

FIG. 3A illustrates a waveform 300 of an inductor current 302 of a DC-DC converter (e.g., circuit 100) over time, in accordance with some embodiments. The waveform 300 additionally shows the load current 304 drawn by the load (e.g., load 106 of circuit 100). In some embodiments, the waveform 300 may be according to the control scheme 200.

At time t0, the control circuit determines that the output voltage has dropped below the voltage threshold and switches the DC-DC converter from the tri-state mode to the charge state. Accordingly, the inductor current 302 increases, which also causes the output voltage to bottom out and then increase. At time t1, the control circuit determines that the output voltage has risen above the voltage threshold (and that the one or more additional criteria have been met, if applicable). Accordingly, the control circuit switches the DC-DC converter from the charge state to the discharge state. The inductor current 302 decreases while the DC-DC converter is in the discharge state.

At time t2, the load current 304 steps up significantly. Accordingly, the output voltage may drop below the voltage threshold again relatively quickly. At time t3, the control circuit detects that the output voltage has dropped below the voltage threshold and switches the DC-DC converter from the discharge state back to the charge state. Accordingly, the inductor current increases to meet the stepped-up load current 304.

At time t4, the control circuit again determines that the output voltage has risen above the voltage threshold (and that the one or more additional criteria have been met, if applicable). Accordingly, the control circuit switches the DC-DC converter from the charge state to the discharge state. The inductor current 302 decreases while the DC-DC converter is in the discharge state.

At time t5, the control circuit again detects that the output voltage has dropped below the voltage threshold and switches the DC-DC converter from the discharge state back to the charge state. Accordingly, the inductor current increases while the DC-DC converter is in the charge state.

The control circuit may switch the DC-DC converter between the charge state and the discharge state based on the output voltage and the voltage threshold, as shown (e.g., according to the first control loop of FIG. 2). However, if the inductor current reaches zero when the DC-DC converter is in the discharge state (e.g., prior to the output voltage dropping below the voltage threshold), then the control circuit may switch the DC-DC converter from the discharge state to the tri-state mode. Additionally, if the inductor current reaches the upper OCP threshold when the DC-DC converter is in the charge state, then the control circuit may switch the DC-DC converter from the charge state to the discharge state according to the second control loop of FIG. 2.

Figure 3B:
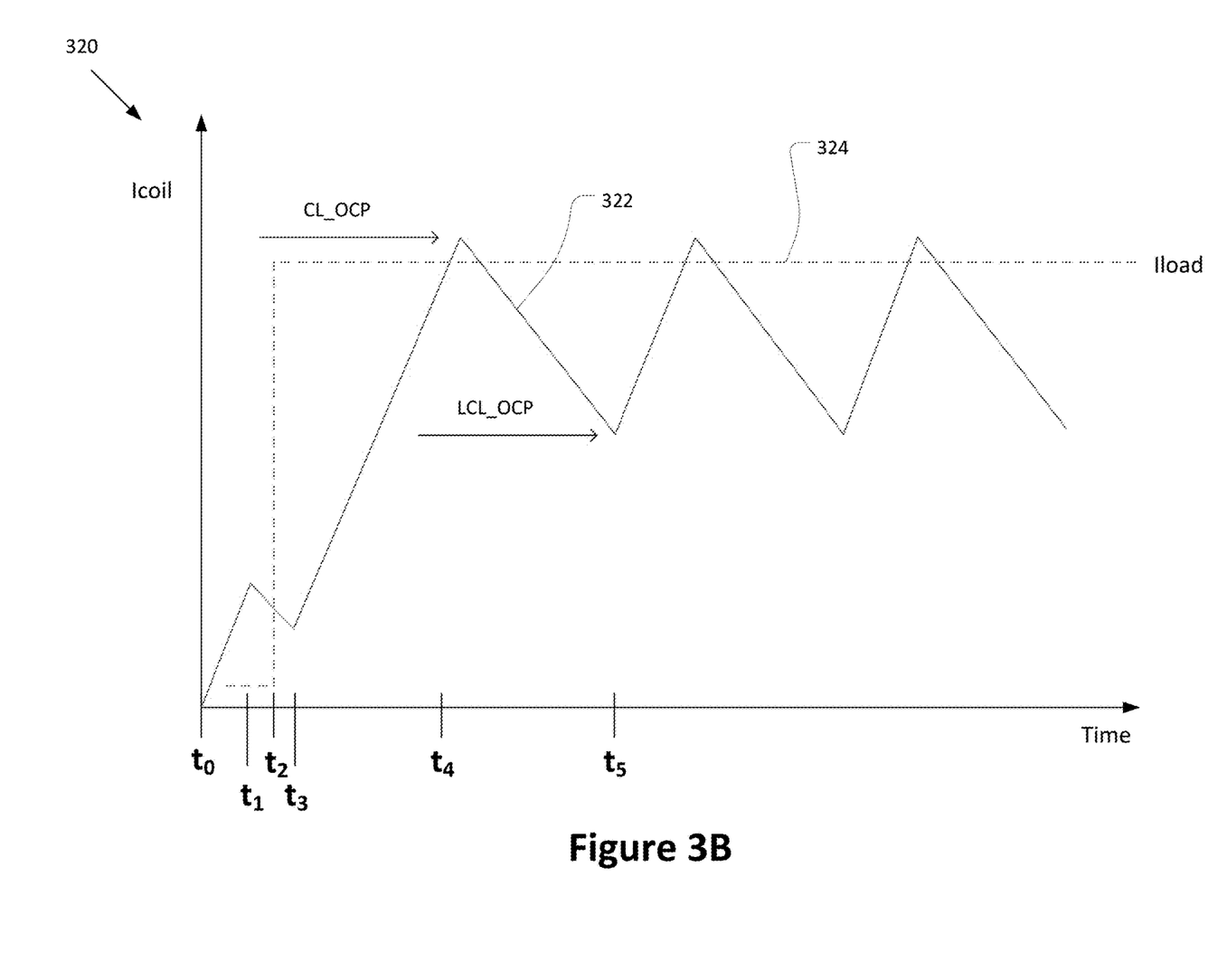
FIG. 3B illustrates another graph of the inductor current in a DC-DC converter over time, in accordance with various embodiments.

For example, FIG. 3B illustrates a waveform 320 of an inductor current 322 of a DC-DC converter (e.g., circuit 100) over time, in which the inductor current 322 reaches the upper OCP threshold and thus triggers the second control loop of FIG. 2, in accordance with some embodiments. The waveform 320 additionally shows the load current 324 drawn by the load (e.g., load 106 of circuit 100). In some embodiments, the waveform 320 may be according to the control scheme 200.

At time t0, the control circuit determines that the output voltage has dropped below the voltage threshold and switches the DC-DC converter from the tri-state mode to the charge state. Accordingly, the inductor current 322 increases, which also causes the output voltage to bottom out and then increase. At time t1, the control circuit determines that the output voltage has risen above the voltage threshold (and that the one or more additional criteria have been met, if applicable). Accordingly, the control circuit switches the DC-DC converter from the charge state to the discharge state. The inductor current 322 decreases while the DC-DC converter is in the discharge state.

At time t2, the load current 324 steps up significantly. Accordingly, the output voltage may drop below the voltage threshold again relatively quickly. At time t3, the control circuit detects that the output voltage has dropped below the voltage threshold and switches the DC-DC converter from the discharge state back to the charge state. Accordingly, the inductor current increases to meet the stepped-up load current 324.

At time t4, the control circuit determines that the inductor current is greater than the upper OCP threshold (CL_OCP). Accordingly, the control circuit switches the DC-DC converter from the charge state to the discharge state. The inductor current 322 decreases while the DC-DC converter is in the discharge state.

At time t5, the control circuit determines that the inductor current is less than the lower OCP threshold (LCL_OCP). Accordingly, the control circuit switches the DC-DC converter from the discharge state back to the charge state. The inductor current increases while the DC-DC converter is in the charge state.

The control circuit may switch the DC-DC converter between the charge state and the discharge state based on the upper and lower OCP thresholds, as shown (e.g., according to the second control loop of FIG. 2). However, if the output voltage increases above the second threshold (and the one or more additional conditions are met, if applicable) when the DC-DC converter is in the charge state, then the control circuit may switch the DC-DC converter from the charge state to the discharge state in accordance with the first control loop of FIG. 1.

The techniques described herein may also be used to efficiently and/or quickly change the target voltage level of the output voltage provided by the DC-DC converter. For example, the target voltage level may be ramped or stepped from a first voltage level to a second voltage level that may be higher or lower than the first voltage level. Ramping using PWM at the overcurrent limit according to prior techniques typically results in large overshoots and long settling time as the integral part of the controller needs to move over a large range. The techniques described herein do not suffer from the same problems, since the control circuit will keep the inductor current high until the output voltage is at the new target voltage level, and then quickly bring the inductor current back down.

Figure 3C:
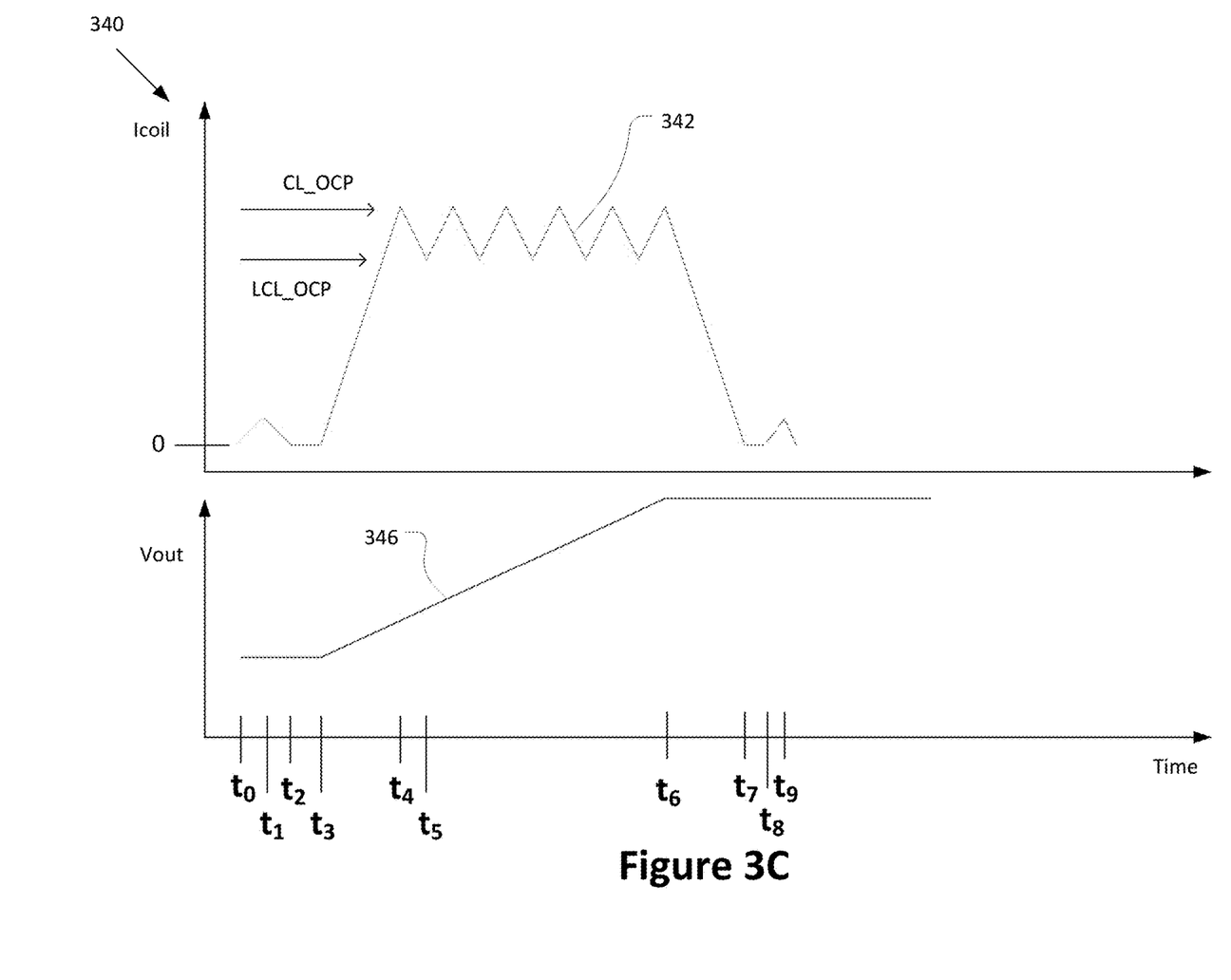
FIG. 3C illustrates a graph of the inductor current in a DC-DC converter over time before, during, and after a voltage ramp, in accordance with various embodiments.

FIG. 3C illustrates example waveforms 340 of an inductor current 342 and a target output voltage 346 of a DC-DC converter (e.g., circuit 100) over time, in which the target output voltage 346 ramps up from a first voltage level to a second voltage level, in accordance with some embodiments. In some embodiments, the waveforms 340 may be according to the control scheme 200.

At time t0, the control circuit determines that the output voltage has dropped below the voltage threshold and switches the DC-DC converter from the tri-state mode to the charge state. Accordingly, the inductor current 342 increases, which also causes the output voltage to bottom out and then increase. At time t1, the control circuit determines that the output voltage has risen above the voltage threshold (and that the one or more additional criteria have been met, if applicable). Accordingly, the control circuit switches the DC-DC converter from the charge state to the discharge state. The inductor current 322 decreases while the DC-DC converter is in the discharge state.

At time t2, the control circuit determines that the inductor current has reached zero. Accordingly, the control circuit switches the DC-DC converter from the discharge state to the tri-state mode. Therefore, no current flows through the inductor.

At time t3, the target output voltage may change from a first voltage level to a second voltage level. Accordingly, the voltage threshold may be adjusted to correspond to the second voltage level. Accordingly, the control circuit detects that the output voltage has dropped below the voltage threshold and switches the DC-DC converter from the discharge state back to the charge state. Therefore, the inductor current increases to adjust the output voltage toward the target output voltage.

In some embodiments, the voltage threshold (e.g., the comparator and/or DAC that implement the voltage threshold) may be dynamically reprogrammed before, during, and/or after a voltage ramp, e.g., depending on the type of ramp and/or inrush current requirements.

At time t4, the control circuit determines that the inductor current is greater than the upper OCP threshold (CL_OCP). Accordingly, the control circuit switches the DC-DC converter from the charge state to the discharge state. The inductor current 342 decreases while the DC-DC converter is in the discharge state.

At time t5, the control circuit determines that the inductor current is less than the lower OCP threshold (LCL_OCP). Accordingly, the control circuit switches the DC-DC converter from the discharge state back to the charge state. The inductor current increases while the DC-DC converter is in the charge state.

The control circuit may switch the DC-DC converter between the charge state and the discharge state based on the upper and lower OCP thresholds, as shown (e.g., according to the second control loop of FIG. 2). At time t6, the target output voltage may finish the ramp and level off at the second voltage level. At or around the time t6, the control circuit determines that the output voltage has increased above the second threshold (and the one or more additional conditions are met, if applicable), and the control circuit switches the DC-DC converter from the charge state to the discharge state in accordance with the first control loop of FIG. 1.

As shown, in some circumstances, the DC-DC converter may remain in the discharge state until, at time t7, the inductor current reaches zero. Accordingly, at time t7, the control circuit may switch the DC-DC converter from the discharge state to the tri-state mode. At time t8, the control circuit may determine that the output voltage has decreased below the voltage threshold, and the control circuit therefore switches the DC-DC converter from the tri-state mode to the charge state. At time t9, the control circuit may determine that the output voltage has increased above the second threshold, and the control circuit therefore switches the DC-DC converter from the charge state to the discharge state. The control circuit may thereafter switch the DC-DC converter between the discharge state and the charge state (and the tri-state mode, if applicable) based on the voltage threshold to maintain the output voltage at the new target voltage level.

Figure 4:
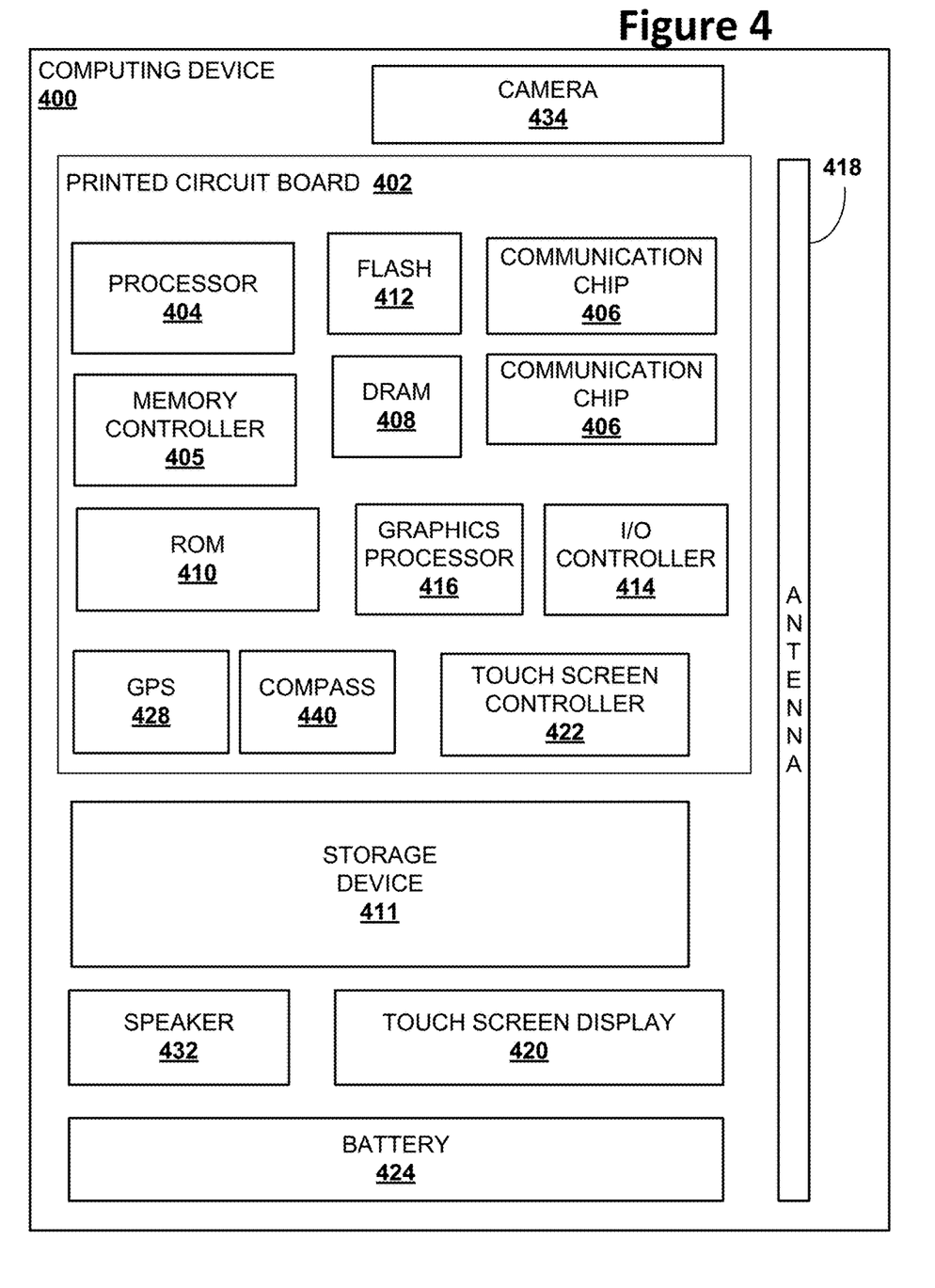
FIG. 4 illustrates an example system configured to employ the apparatuses and methods described herein, in accordance with various embodiments.

FIG. 4 illustrates an example computing device 400 that may employ the apparatuses and/or methods described herein (e.g., circuit 100, the control scheme 200, the signals of FIGS. 3A-3C, etc.), in accordance with various embodiments. As shown, computing device 400 may include a number of components, such as one or more processor(s) 404 (one shown) and at least one communication chip 406. In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, memory controller 405, volatile memory (e.g., dynamic random access memory (DRAM) 408), non-volatile memory such as read only memory (ROM) 410, flash memory 412, storage device 411 (e.g., a hard-disk drive (HDD)), an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD)) (not shown), and so forth. In various embodiments, the processor 404 may be integrated on the same die with other components to form a System on Chip (SoC).

In some embodiments, the one or more processor(s) 404, flash memory 412, and/or storage device 411 may include associated firmware (not shown) storing programming instructions configured to enable computing device 400, in response to execution of the programming instructions by one or more processor(s) 404, to practice all or selected aspects of the methods described herein. In various embodiments, these aspects may additionally or alternatively be implemented using hardware separate from the one or more processor(s) 404, flash memory 412, or storage device 411.

In various embodiments, one or more components of the computing device 400 may include circuit 100 and/or control scheme 200, use the signals of FIGS. 3A-3C, and/or otherwise employ techniques described herein. For example, the processor 404, communication chip 406, I/O controller 414, memory controller 405, and/or another component of computing device 400 may include circuit 100 and/or control scheme 200, use the signals of FIGS. 3A-3C, and/or otherwise employ techniques described herein.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth, and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 400 may be any other electronic device that processes data.

Some non-limiting Examples of various embodiments are provided below.

Example 1 is a direct current (DC)-DC converter circuit comprising: an output stage to provide a regulated output voltage at an output node, wherein the output stage includes an inductor, and wherein the DC-DC converter circuit is operable in a first state in which the output node is coupled to a supply rail via the inductor and a second state in which the output node is coupled to output node is coupled to a ground terminal via the inductor; and a control circuit coupled to the output stage. The control circuit is to, as part of a first control loop: switch the DC-DC converter circuit from the first state to the second state based on a determination that the regulated output voltage is greater than a first voltage threshold; and switch the DC-DC converter circuit from the second state to the first state based on a determination that the regulated output voltage is less than a second voltage threshold. The control circuit is further to, as part of a second control loop, switch the DC-DC converter circuit from the first state to the second state based on a determination that an inductor current through the inductor is greater than a first current threshold; and switch the DC-DC converter circuit from the second state to the first state based on a determination that the inductor current is less than a second current threshold.

Example 2 is the DC-DC converter circuit of Example 1, wherein, as part of the first control loop, the control circuit is to switch the DC-DC converter circuit from the first state to the second state based on the determination that the regulated output voltage is greater than the first voltage threshold and a determination that the inductor current is greater than a minimum current threshold.

Example 3 is the DC-DC converter circuit of Example 1 or 2, wherein the DC-DC converter is further operable in a third state in which the output node is uncoupled from the supply rail and the ground terminal via the inductor of the output stage, and wherein the control circuit is further to: switch the DC-DC converter from the second state to the third state when the inductor current reaches zero.

Example 4 is the DC-DC converter circuit of Example 3, wherein the determination that the regulated output voltage is less than the second voltage threshold is a first determination, and wherein the control circuit is further to: switch the DC-DC converter from the third state to the first state based on a second determination that the regulated output voltage is less than the second voltage threshold.

Example 5 is the DC-DC converter circuit of any of Examples 1-4, wherein the first voltage threshold is the same as the second voltage threshold.

Example 6 is the DC-DC converter circuit of any of Examples 1-5, wherein the inductor is coupled between the output node and an internal node, and wherein the output stage further includes: a pull-up transistor coupled between the internal node and the supply rail; and a pull-down transistor coupled between the internal node and the ground terminal; wherein: when the DC-DC converter circuit is in the first state, the pull-up transistor is on and the pull-down transistor is off; and when the DC-DC converter circuit is in the second state, the pull-up transistor is off and the pull-down transistor is on.

Example 7 is the DC-DC converter circuit of any of Examples 1-6, wherein the control circuit is to dynamically adjust the first voltage threshold to adjust a target voltage level of the regulated output voltage.

Example 8 is the DC-DC converter circuit of any of Examples 1-7, wherein the DC-DC converter is to provide the regulated output voltage to a circuit block at the output node, wherein the circuit block is to use the regulated output voltage as a power supply, and wherein the circuit block is on a same integrated circuit die as the DC-DC converter circuit.

Example 9 is a circuit comprising: a direct current (DC)-DC converter that includes to generate an output voltage at an output node. The DC-DC converter includes: an inductor coupled between the output node and an intermediate node; a pull-up transistor coupled between the intermediate node and a supply rail that is to receive a supply voltage; and a pull-down transistor coupled between the intermediate node and a ground terminal, wherein the DC-DC converter is operable in a first state in which the pull-up transistor is on and the pull-down transistor is off and a second state in which the pull-up transistor is off and the pull-down transistor is on. The circuit of Example 9 further comprises a control circuit to switch the DC-DC converter from the first state to the second state based on a determination that the output voltage is greater than a voltage threshold and an inductor current through the inductor is greater than a minimum current threshold.

Example 10 is the circuit of Example 9, wherein the voltage threshold is a first voltage threshold, and wherein the control circuit is further to switch the DC-DC converter from the second state to the first state based on a determination that the output voltage is less than a second voltage threshold.

Example 11 is the circuit of Example 10, wherein the control circuit is further to: control another switch of the DC-DC converter from the first state to the second state based on a determination that an inductor current through the inductor is greater than a first current threshold, wherein the first current threshold is greater than the minimum current threshold; and control another switch of the DC-DC converter from the second state to the first state based on a determination that the inductor current is less than a second current threshold, wherein the second current threshold is less than the first current threshold.

Example 12 is the circuit of Example 10 or 11, wherein the first voltage threshold is the same as the second voltage threshold.

Example 13 is the circuit of any of Examples 9-12, wherein the DC-DC converter is further operable in a third state in which the pull-up transistor is off and the pull-down transistor is off, and wherein the control circuit is further to: detect when the inductor current reaches zero after the DC-DC converter is switched to the second state; and switch the DC-DC converter from the second state to the third state based on the detection.

Example 14 is the circuit of Example 13, wherein the control circuit is further to switch the DC-DC converter from the third state to the first state based on a determination that the regulated output voltage is less than the voltage threshold or another voltage threshold.

Example 15 is the circuit of any of Examples 9-14, wherein the control circuit is to dynamically adjust the voltage threshold to adjust a target voltage level of the output voltage.

Example 16 is the circuit of any of Examples 9-15, further comprising a circuit block coupled to the output node to receive the output voltage and use the output voltage as a power supply.

Example 17 is a computing system comprising: a motherboard; and an integrated circuit die mounted to the motherboard. The integrated circuit die comprises: a circuit block; and a voltage regulator to provide a regulated output voltage to the circuit block at an output node. The voltage regulator includes: an output stage that includes an inductor coupled to the output node, wherein the voltage regulator is operable in a charge state in which an inductor current provided to the output node through the inductor is to increase and a discharge state in which the inductor current is to decrease; and a control circuit coupled to the output stage. The control circuit is to, as part of a first control loop: switch the voltage regulator from the charge state to the discharge state if the regulated output voltage is greater than a voltage threshold and one or more additional criteria are met; and switch the DC-DC converter circuit from the discharge state to the charge state if the regulated output voltage is less than the voltage threshold. The control circuit is further to, as part of a second control loop: switch the voltage regulator from the charge state to the discharge state if the inductor current is greater than a first current threshold; and switch the voltage regulator from the discharge state to the charge state if the inductor current is less than a second current threshold, wherein the second current threshold is less than the first current threshold.

Example 18 is the computing system of Example 17, wherein the one or more additional criteria include that the inductor current is greater than a minimum current threshold.

Example 19 is the computing system of Example 17 or 18, wherein the voltage regulator is further operable in a tri-state mode in which the inductor current is zero, and wherein the control circuit is further to: switch the voltage regulator from the discharge state to the tri-state mode when the inductor current reaches zero; and switch the voltage regulator from the tri-state mode to the charge state if the regulated output voltage is less than the voltage threshold.

Example 20 is the computing system of any of Examples 17-19, wherein the inductor is coupled between the output node and an internal node of the output stage, and wherein the output stage further includes: a pull-up transistor coupled between the internal node and a supply rail; and a pull-down transistor coupled between the internal node and a ground terminal; wherein: when the DC-DC converter circuit is in the charge state, the pull-up transistor is on and the pull-down transistor is off; and when the DC-DC converter circuit is in the discharge state, the pull-up transistor is off and the pull-down transistor is on.

Example 21 is the computing system of any of Examples 17-20, wherein the control circuit is to dynamically adjust the voltage threshold to adjust a target voltage level of the regulated output voltage.

Example 22 is the computing system of any of Examples 17-21, further comprising one or more of a memory circuit, a display, or an antenna coupled to the integrated circuit die.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A direct current (DC)-DC converter circuit comprising:
an output stage to provide a regulated output voltage at an output node, wherein the output stage includes an inductor, and wherein the DC-DC converter circuit is operable in a first state in which the output node is coupled to a supply rail via the inductor, a second state in which the output node is coupled to a ground terminal via the inductor, and a third state in which the output node is uncoupled from the supply rail and the ground terminal via the inductor of the output stage; and
a control circuit coupled to the output stage, the control circuit to:
as part of a first control loop:
switch the DC-DC converter circuit from the first state to the second state responsive to a determination that the regulated output voltage is greater than a first voltage threshold;
switch the DC-DC converter circuit from the second state to the first state responsive to a determination that the regulated output voltage is less than a second voltage threshold; and
switch the DC-DC converter from the second state to the third state responsive to a determination that the inductor current reaches zero;
as part of a second control loop:
switch the DC-DC converter circuit from the first state to the second state responsive to a determination that the inductor current through the inductor is greater than a first current threshold; and
switch the DC-DC converter circuit from the second state to the first state responsive to a determination that the inductor current is less than a second current threshold, wherein the first and second current thresholds are positive and non-zero values, and wherein the first current threshold is greater than the second current threshold.

2. The DC-DC converter circuit of claim 1, wherein, as part of the first control loop, the control circuit is to switch the DC-DC converter circuit from the first state to the second state based on the determination that the regulated output voltage is greater than the first voltage threshold and a determination that the inductor current is greater than a minimum current threshold, wherein the minimum current threshold is positive, non-zero, and less than the first and second current thresholds.

3. The DC-DC converter circuit of claim 1, wherein the determination that the regulated output voltage is less than the second voltage threshold is a first determination, and wherein the control circuit is further to:
switch the DC-DC converter from the third state to the first state based on a second determination that the regulated output voltage is less than the second voltage threshold, wherein the second determination is different than the first determination.

4. The DC-DC converter circuit of claim 1, wherein the first voltage threshold is the same as the second voltage threshold.

5. The DC-DC converter circuit of claim 1, wherein the inductor is coupled between the output node and an internal node, and wherein the output stage further includes:
a pull-up transistor coupled between the internal node and the supply rail; and
a pull-down transistor coupled between the internal node and the ground terminal;
wherein:
when the DC-DC converter circuit is in the first state, the pull-up transistor is on and the pull-down transistor is off; and
when the DC-DC converter circuit is in the second state, the pull-up transistor is off and the pull-down transistor is on.

6. The DC-DC converter circuit of claim 1, wherein the control circuit is to dynamically adjust the first voltage threshold to adjust a target voltage level of the regulated output voltage.

7. The DC-DC converter circuit of claim 1, wherein the DC-DC converter is to provide the regulated output voltage to a circuit block at the output node, wherein the circuit block is to use the regulated output voltage as a power supply, and wherein the circuit block is on a same integrated circuit die as the DC-DC converter circuit.

8. A circuit comprising:
a direct current (DC)-DC converter that is to generate an output voltage at an output node, wherein the DC-DC converter includes:
an inductor coupled between the output node and an intermediate node;
a pull-up transistor coupled between the intermediate node and a supply rail that is to receive a supply voltage; and
a pull-down transistor coupled between the intermediate node and a ground terminal, wherein the DC-DC converter is operable in a first state in which the pull-up transistor is on and the pull-down transistor is off, a second state in which the pull-up transistor is off and the pull-down transistor is on, and a third state in which the pull-up transistor is off and the pull-down transistor is off; and
a control circuit to:
switch the DC-DC converter from the first state to the second state responsive to a determination that the output voltage is greater than a voltage threshold and an inductor current through the inductor is greater than a minimum current threshold, wherein the minimum current threshold is positive and non-zero;
switch the DC-DC converter from the first state to the second state responsive to a determination that the inductor current through the inductor is greater than a first current threshold, wherein the first current threshold is greater than the minimum current threshold;
switch the DC-DC converter from the second state to the first state responsive to a determination that the inductor current is less than a second current threshold, wherein the second current threshold is greater than the minimum current threshold and less than the first current threshold; and
switch the DC-DC converter from the second state to the third state responsive to a determination that the inductor current reaches zero.

9. The circuit of claim 8, wherein the voltage threshold is a first voltage threshold, and wherein the control circuit is further to switch the DC-DC converter from the second state to the first state responsive to a determination that the output voltage is less than a second voltage threshold.

10. The circuit of claim 9, wherein the first voltage threshold is the same as the second voltage threshold.

11. The circuit of claim 8, wherein the control circuit is further to switch the DC-DC converter from the third state to the first state based on a determination that the output voltage is less than the voltage threshold or another voltage threshold.

12. The circuit of claim 8, wherein the control circuit is to dynamically adjust the voltage threshold to adjust a target voltage level of the output voltage.

13. The circuit of claim 8, further comprising a circuit block coupled to the output node to receive the output voltage and use the output voltage as a power supply.

14. A computing system comprising:
a motherboard; and
an integrated circuit die mounted to the motherboard, the integrated circuit die comprising:
a circuit block;
a voltage regulator to provide a regulated output voltage to the circuit block at an output node, the voltage regulator including:
an output stage that includes an inductor coupled to the output node, wherein the voltage regulator is operable in a charge state in which an inductor current provided to the output node through the inductor is to increase, a discharge state in which the inductor current is to decrease, and a tri-state mode in which the inductor current is zero; and
a control circuit coupled to the output stage, the control circuit to, as part of a first control loop:
switch the voltage regulator from the charge state to the discharge state responsive to a determination that the regulated output voltage is greater than a voltage threshold and one or more additional criteria are met;
switch the voltage regulator from the discharge state to the charge state responsive to a determination that the regulated output voltage is less than the voltage threshold; and
switch the voltage regulator from the discharge state to the tri-state mode responsive to a determination that the inductor current reaches zero; and
wherein the control circuit is further to, as part of a second control loop:
switch the voltage regulator from the charge state to the discharge state responsive to a determination that the inductor current is greater than a first current threshold; and switch the voltage regulator from the discharge state to the charge state responsive to a determination that the inductor current is less than a second current threshold, wherein the second current threshold is less than the first current threshold, and wherein the first and second current thresholds are positive and non-zero values.

15. The computing system of claim 14, wherein the one or more additional criteria include that the inductor current is greater than a minimum current threshold, wherein the minimum current threshold is positive, non-zero, and less than the first and second current thresholds.

16. The computing system of claim 14, wherein the control circuit is further to:
switch the voltage regulator from the tri-state mode to the charge state responsive to a determination that the regulated output voltage is less than the voltage threshold.

17. The computing system of claim 14, wherein the inductor is coupled between the output node and an internal node of the output stage, and wherein the output stage further includes:
a pull-up transistor coupled between the internal node and a supply rail; and
a pull-down transistor coupled between the internal node and a ground terminal;
wherein:
when the DC-DC converter circuit is in the charge state, the pull-up transistor is on and the pull-down transistor is off; and
when the DC-DC converter circuit is in the discharge state, the pull-up transistor is off and the pull-down transistor is on.

18. The computing system of claim 14, wherein the control circuit is to dynamically adjust the voltage threshold to adjust a target voltage level of the regulated output voltage.

19. The computing system of claim 14, further comprising one or more of a memory circuit, a display, or an antenna coupled to the integrated circuit die.

* * * * *